United States Patent

[11] 3,566,240

| [72] | Inventors | Kiyokazu Okamota;<br>Takeo Ando, Tokyo, Japan |
|---|---|---|
| [21] | Appl. No. | 761,640 |
| [22] | Filed | Sept. 23, 1968 |
| [45] | Patented | Feb. 23, 1971 |
| [73] | Assignee | Nippon Electric Company, Limited<br>Tokyo, Japan |
| [32] | Priority | Sept. 22, 1967 |
| [33] | | Japan |
| [31] | | 42/61155 |

[54] DIGITAL DRIVING EQUIPMENT
8 Claims, 20 Drawing Figs.

[52] U.S. Cl. ............................................... 318/600,
                                                       318/604
[51] Int. Cl. ............................................ G05b 1/06
[50] Field of Search ........................................ 318/18—33

[56] References Cited
UNITED STATES PATENTS

| 3,400,314 | 9/1968 | Wilson .......................... | 318/18 |
| 3,414,785 | 12/1968 | Orahood et al. ............... | 318/18 |

*Primary Examiner*—B. Dobeck
*Attorney*—Ostrolenk, Faber, Gerb and Soffen

ABSTRACT: Digital driving equipment for moving (i.e., positioning) a controlled member and providing means for smooth acceleration and deceleration of the controlled member; and including means for preventing misfollowup, and for maintaining droop within a prescribed value. Means are provided for determining the control point of the controlled member, for comparing this information against the command point to which it is desired the controlled member be moved and for modifying the distribution command signal accordingly and thereby operate the controlled member to maintain droop within the prescribed range to provide for smooth acceleration and deceleration of the controlled member and further and most importantly to prevent misfollowup.

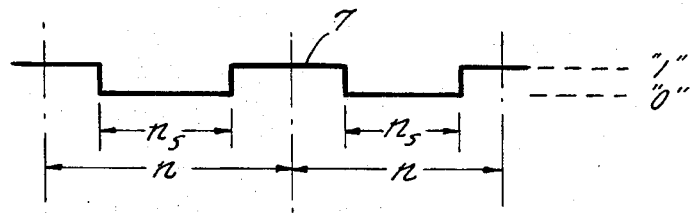
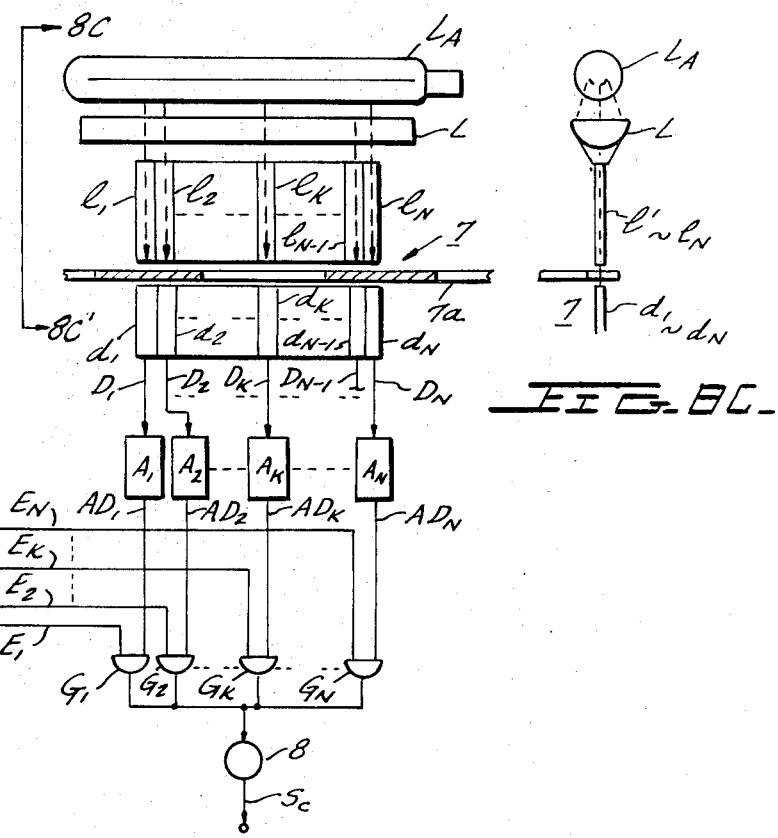
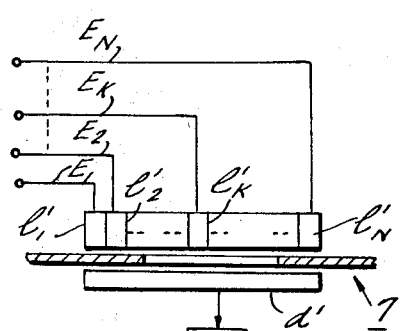
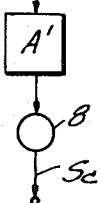

INVENTORS
KIYOKAZU OKAMOTO
TAKEO ANDO
BY
OSTROLENK, FABER, GERB & SOFFEN
ATTORNEYS

DIGITAL DRIVING EQUIPMENT

The present invention relates to digital driving equipment, and more particularly to an improvement in digital driving equipment which incorporates conversion means for converting the angular position of the driving unit step motor into a control signal which is further related to the distribution signal for accomplishing smooth acceleration and deceleration of the controlled member, maintenance of droop within a small prescribed range and prevention of misfollowup.

Conventional digital driving equipment normally is comprised of a distribution command unit operable under control of first information which prescribes the command feed rate in order to generate appropriate distribution command signals which may be comprised of pulses occurring at a rate which is inversely proportional to the desired feed rate. A distributor is connected to the distribution command unit and operates to generate distribution signals under control of both the distribution command signals and second information which prescribes the manner (i.e., direction) in which the distribution command signals are to be distributed. These distribution signals are applied to a driving unit which normally comprises a step motor for driving a controlled member in conformity with the distribution signals. A mechanical means is provided for coupling the controlled member to the step motor of the driving unit (which mechanical means is normally comprised of gear means). The distribution command signals occur at time intervals which are inversely proportional to the command feed rate, i.e., $I_t = 1/$(command feed rate). The above-mentioned second information normally consists of a signal representing a distributing direction, viz forward or reverse direction.

The rotor of the step motor is not in perfect synchronism with the distribution command signals and the distribution signals. Therefore, when the step motor is accelerated or decelerated, a time lag exists between the distribution signal and the actual rotation of the step motor. If the distribution signal is applied to the driving unit at high speed compared with the rotation of the step motor, the time lag becomes abruptly large, and, in the worst case, misfollowup occurs in such conventional digital driving equipment. It is the misfollowup that causes a control point, which represents a current position of the step motor to move out of the stable operating region, depending upon the command point to be approached, and thereby moves to a point different from (and spaced from) said command point. In addition, when a distribution signal is supplied to such driving equipment at high speed, even in cases where misfollowup does not occur, a large droop has nevertheless been found to develop in such instances. Droop is defined as the position difference between the control point (i.e., the actual point occupied by the controlled member at any given instant) and the command point (which is the point to which the controlled member is to be moved). Since conventional digital driving equipment is normally of the open-loop system type which is not provided with means for detecting rotation of the step motor, misfollowup is bound to occur.

The present invention is characterized by providing digital driving equipment having novel and simple means for eliminating the defects normally found in such conventional systems, and most particularly for eliminating misfollowup.

The digital driving equipment according to the present invention provides both first and second means which are integrated into conventional digital driving equipment for eliminating the above-mentioned defects. The first means is operated under control of the step motor which drives the controlled member, and further under control of the distributor for generating a distribution control signal. The second means generates a controlled distribution signal which is supplied to the distributor in place of the normal distribution signal and is generated in accordance with the state of the distribution command signal and the distribution control signal at any given instant.

The first means also receives the distribution signal from the distributor and compares this against the control point information to determine whether a distribution command signal is to be applied to the distributor dependent upon the relationship between the distribution signal and the control point of the controlled member at any given instant. This arrangement assures application of the distribution signals to the step motor in such a way as to provide for smooth acceleration and deceleration of the controlled member; maintenance of the droop within a small prescribed range; and prevention of misfollowup.

It is, therefore, one object of the present invention to provide digital driving equipment for positioning a controlled member comprising means for monitoring the position of the controlled member; means for comparing the monitored position against the distribution signals controlling movement of the controlled member and means for selectively operating the distributor to prevent misfollowup of the controlled member; to provide smooth acceleration and deceleration of the controlled member; and to maintain droop within a small prescribed range.

These as well as other objects of the present invention will become apparent when reading the accompanying description and drawings in which.

Figure 7A:
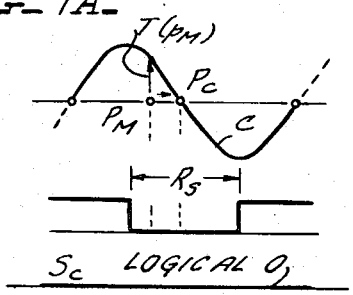
Figure 7B:
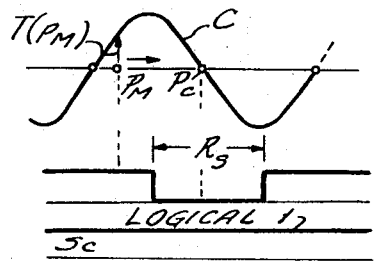

FIGS. 7a and 7b each illustrate a group of curves showing the relationship among a distribution control signal, the stable operating region of a torque/angle curve, the command point, the control point and the generated torque of a step motor.

Figure 3:
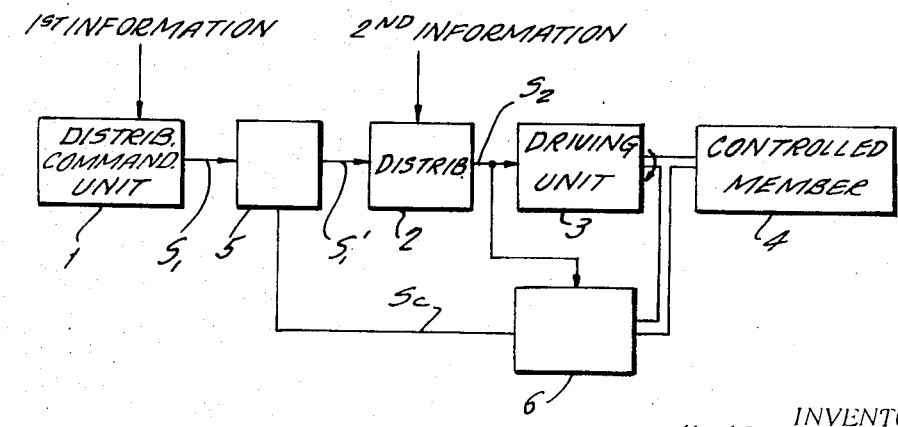
FIG. 3 is a block diagram of a digital driving system designed in accordance with the principles of the present invention.

FIGS. 8a and 8b respectively illustrate a waveform and; one detailed embodiment of the first means of FIG. 3.

FIG. 8c shows an end view of the embodiment of FIG. 8b looking in the direction of arrow 8c–8c'.

Figure 10:
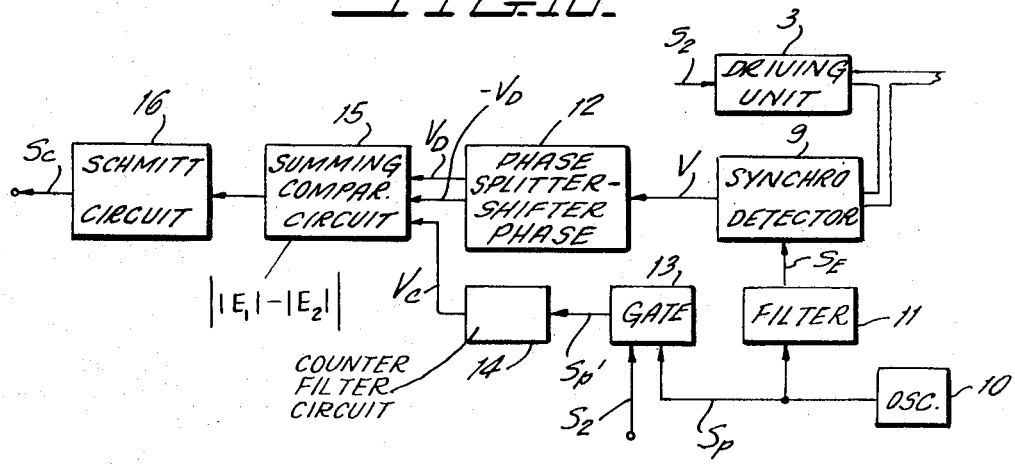

FIGS. 9 and 10 show additional alternative embodiments of the first means of FIGS. 3 and 8.

Figure 11B:
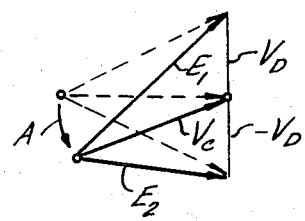
Figure 11A:
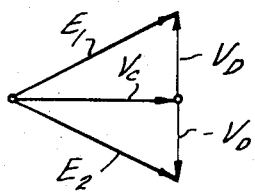

FIGS. 11a and 11b are vector diagrams illustrating the operating principles of the embodiment of FIG. 10.

Figure 12:
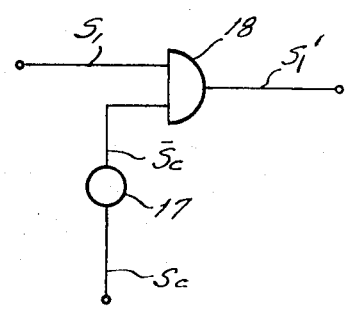

FIG. 12 shows in greater detail the first means of the system of FIG. 3.

Figure 13:
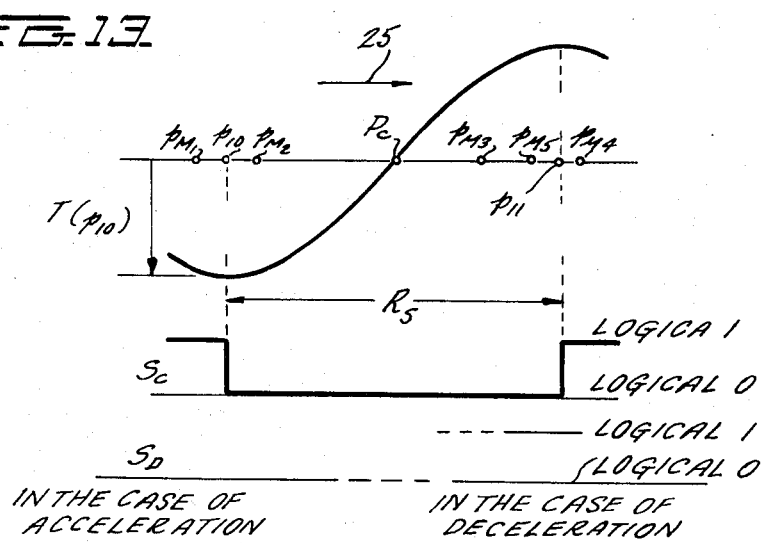

FIG. 13 shows a plurality of waveforms which are useful in explaining the operation of the digital driving equipment of the present invention.

Figure 14:
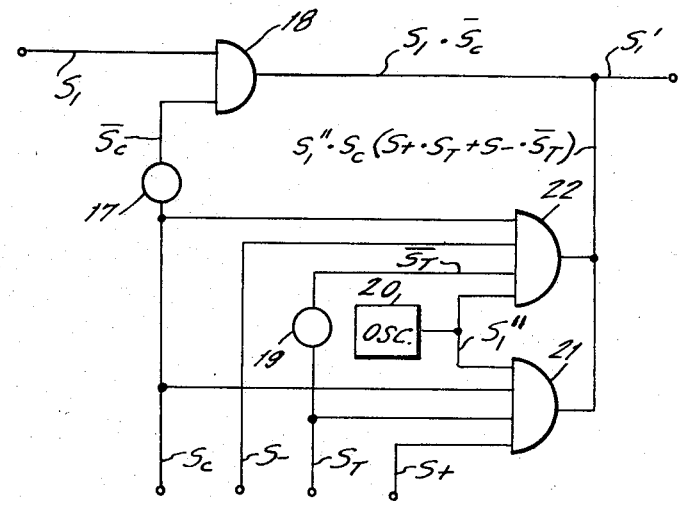

FIG. 14 shows an alternative embodiment for the second means of FIG. 12.

Figure 15:
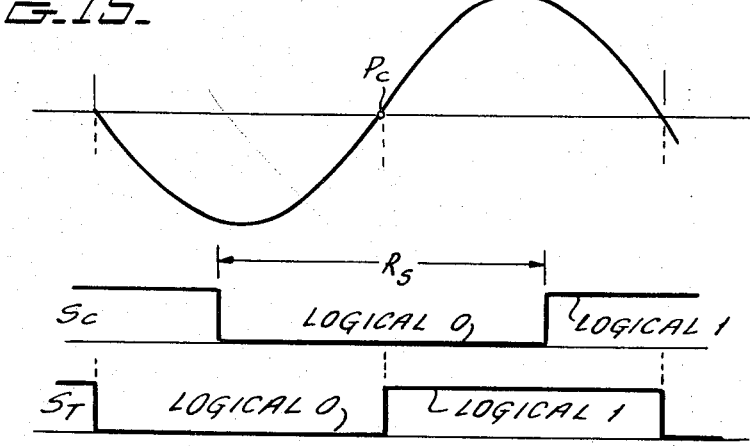

FIG. 15 shows a plurality of waveforms useful in illustrating the operation of the embodiment of FIG. 14.

Figure 1:
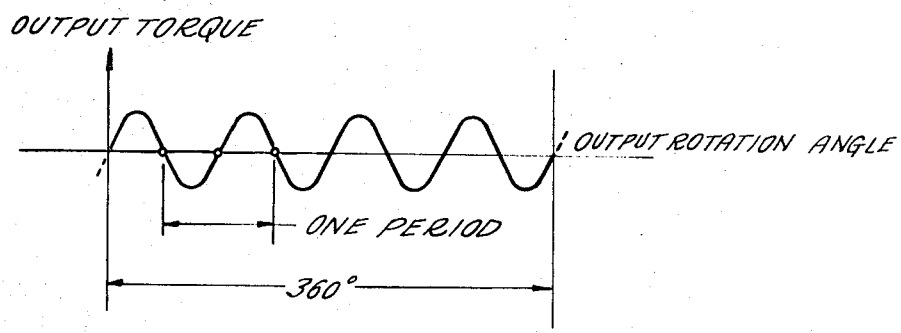
FIG. 1 is a torque/angle curve illustrating the relation between torque and angular position of a step motor.
Figure 16:
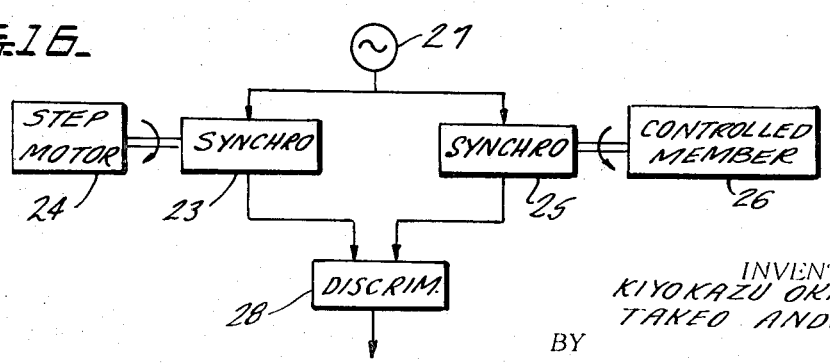

FIG. 16 is a block diagram showing one technique for compensating for droop. FIG. 1 shows a torque/angle curve useful in illustrating the relationship between torque and the angular position of the step motor are plotted along the ordinate and abscissa, respectively. The torque/angle curve is a periodic function and comprises four periods in one rotational cycle of the step motor. Point $P_s$ represents a stable operating point, while $P_{A1}$ and $P_{A2}$ are unstable points. The stable operating region containing stable point $P_s$ lies within the range between unstable points $P_{A1}$ and $P_{A2}$.

Figure 2:
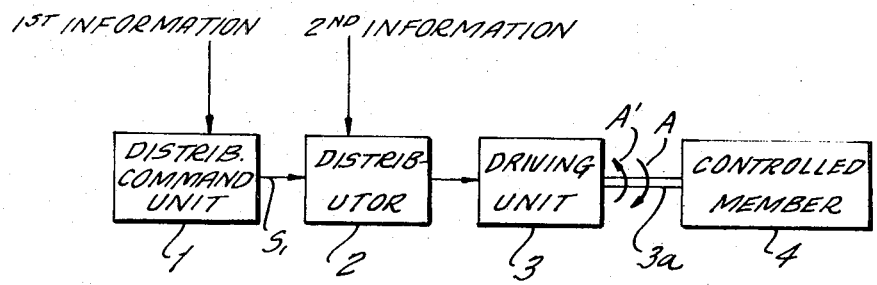
FIG. 2 is a block diagram showing one conventional digital driving system which includes a step motor.

FIG. 2 is a block diagram showing a conventional digital driving apparatus which includes a step motor and consists of a distribution command unit 1 for generating a distribution command signal $S_1$ at time intervals $I_t = 1/$(command feed rate), i.e. inversely proportional to the command feed rate, in accordance with first information applied to its input terminal which prescribes the command feed rate of a controlled member 4. The input information may be supplied by means of a perforated tape which is read by a suitable tape reader (not shown) provided as part of the distribution command unit 1. The output of the distribution command unit 1 is coupled to one input of a distributor 2 which may, for example, be a digital curve interpolator which employs a differential analyzer for generating a distribution signal $S_2$ developed as a result of receiving the distribution command signal $S_1$ and second information which prescribes the manner (i.e. direction) of distribution. The second information may also be provided upon a perforated tape which may be read by a suitable tape reader (not shown) provided as part of the distributor 2. A driving unit 3, which includes a motor (not shown) receives the distribution signals $S_2$ for driving a controlled member by the torque developed in the motor. FIG. 2 shows the connection between the controlled member 4 and the driving unit 3 as being a shaft 3a capable of rotating in either the direction A or the direction A'. While the arrows A and A' indicate rotational movement of the controlled member, it is also possible to impart translational movement and hence the showing of FIG. 2 is merely exemplary, it being understood that either translational or rotational movement (or both) may be imparted to the controlled member.

The apparatus of the present invention is shown in FIG. 3 in block diagram form and consists of the basic conventional digital driving equipment of FIG. 3 (which may, for example, be a numerical control system) and which further includes a second means 5 for receiving the distribution command signal $S_1$ and which is further controlled by distribution control signals $S_c$ to supply a controlled command signal $S_1'$ to a distributor 2. A first means 6 is also provided for generating the distribution control signal $S_c$ when the "control point" of the step motor (provided in driving unit 3), whose "control point" rotates toward a "command point," is in a prescribed position relationship with said "command point." The command point is one of a number of stable points wherein each stable point is distributed among a plurality of steps of the step motor and moves by one step whenever a driving unit receives the distribution signal $S_2$.

An explanation of "command point" $P_{Pc}$ and the "control point" $P_M$ of a step motor will now be set forth.

A "command point" $P_c$ (i.e. the point toward which the controlled member is to be moved) is distributed in a plurality of steps and is one of the stable operating points which moves by one step whenever the driving unit 3 receives a distribution signal $S_2$. The "control point" $P_M$ is correlatively fixed to the rotor of the step motor (i.e. is coupled to rotate with the rotor of the step motor) and is in a prescribed positional relationship with the "command point" $P_c$ when the rotor rests in a state where the torque generated in the step motor. The "command point" $P_c$ may move in stepwise fashion either forwardly or rearwardly in conformity with a signal of a given amplitude and positive or negative polarity, i.e. S+ or S— (which comprises the distribution signal $S_2$) said movement occurring whenever the distribution signal $S_2$ is supplied from the distributor 2. The "control point" $P_M$ is a point which follows the "command point" $P_c$ dependent upon the torque generated in the step motor.

A consideration of the interrelationship of the "stable points," "command points" $P_c$, "control points" $P_M$ and the torque generated by the step motor will now be given.

Figure 4:
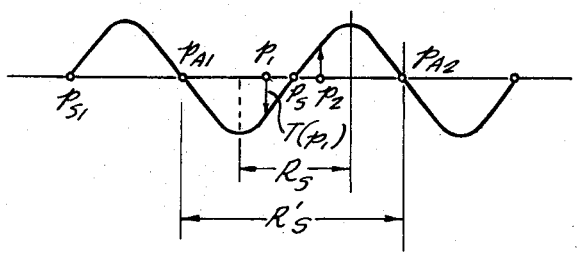
FIG. 4 shows a waveform useful in illustrating both the operation of conventional digital driving equipment employing a step motor and the stable and unstable points along a torque/angle curve.

FIG. 4 illustrates the basic operation of the digital driving equipment shown in FIG. 2 in which a section of one period of the output rotation angle is shown in this FIG. Points $P_s$, $P_{A1}$ and $P_{A2}$ of FIG. 1 correspond respectively, to points $P_s$, $P_{A1}$ and $P_{A2}$ of FIG. 4, while the point $P_s$ is the "command point" $P_c$ (i.e. the point toward which the controlled member is to be moved). When the "control point" $P_M$ is located at a point $P_1$, the torqub generated by the step motor is $T(P_M) = T(P_1)$.

Since the conventional digital driving equipment of FIG. 2 operates so as to rotate a step motor to make $T(P_M) = 0$, the "control point" $P_M$ moves from point $P_1$ toward point $P_s$. Considering also FIG. 5, the curve K which includes the point $P_c$ clearly indicates that the torque at this particular moment is 0 which further indicates that the control point coincides with the command point. As a result of operation of the distributor, the polyphase signal is stepped from waveform K to waveform $K_1$ which, in turn, will cause the motor to develop a torque with an amplitude and direction sufficient to return the control point to the 0 axis so as to "follow" the command signal (i.e. the distribution signal). Thus, returning to FIG. 4, the rotation of the step motor causes the "control point" $P_M$ to move from point $P_1$ toward point $P_s$. Similarly, if the "control point" $P_M$ is at a point $P_2$, the "control point" $P_M$ also moves toward the point $P_S$ (indicating a reverse stepwise movement of the control point) due to the fact that the step motor rotates in order to reduce the torque $T(P_M) = 0$. Since the torque $T(P_M)$ at point $P_s$ is $T(P_M) = 0$, at the step motor will not rotate and the "control point" $P_M$ settles at the point $P_s$. Hence the point $P_s$ is referred to as a "stable point."

On the other hand, since the torque $T(P_{A1})$ at a point $P_{A1}$ is $T(P_A1) = 0$, if the "control point" $P_M$ is located at the point $P_{A1}$, the step motor will not rotate, theoretically. However, when the "control point" $P_M$ is shifted even partially from the point $P_{A1}$ toward either side thereof, a torque $T(P_M)$ is generated so that the "control point" $P_M$ may actually move away from the point $P_{A1}$. Thus the step motor rotates and the "control point" $P_M$ will actually move toward an adjacent stable point $P_{s1}$ or toward $P_s$. Accordingly the point $P_{A1}$ is referred to as an "unstable point." It can be realized from the above description that the point $P_{A2}$ is similarly an unstable point. Hence the region $R'_s$ which extends up to but does not include the unstable points $P_{A1}$ and $P_{A2}$ is a "stable region" for the stable point $P_s$ (= "command point" $P_c$). However, a more practical "stable region" $R_s$ is the region as shown in FIG. 4, where a restoring torque $T(P_M)$ becomes large in conformity with the positional difference between the "command point" $P_c$ and the "control point" $P_M$, which difference is also commonly identified as the value of the droop. Additionally, the relationship between and among the "control point" $P_M$, "command point" $P_c$ and "stable region" $R_s$ (or $R'_s$) is dealt with symmetrically irrespective of a forward or reverse rotation of the step motor if the "control point" $P_M$ is on the "command point" $P_c$ and the "stable region" $R_s$ is determined so that the "control point" $P_M$ may be located in the middle of the "stable region" (or $R'_s$). Any other relative position may, of course, be employed.

The significant points of the above-described explanation are:

1. Stable and unstable points occur in alternating fashion along the torque/angle curve. Thus, for any given stable point (which is located at the point where the torque/angle curve crosses 0) there are two unstable points on opposite sides of the stable point which are located where the torque/angle curve crosses 0 on opposite sides of the stable point. Conversely, any unstable point has two stable points on either side of it in a similar fashion.

2. Once the torque/angle curve is selected, the position of a "stable point" is determined for the selected torque/angle curve.

Figure 5:
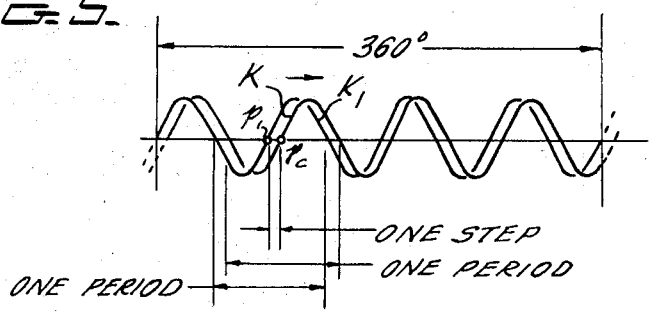
FIG. 5 shows a plurality of waveforms which illustrate the stepwise movement of the misfollowup phenomenon.

The operation of the digital driving equipment of the present invention shown in FIG. 3 is as follows:

A "stable point" upon which the "control point" $P_M$ settles in an initial period (for example, at the time the power source is switched on) is made to coincide with an initial position of a "command point" $P_c$. The torque/angle curve is moved in a stepwise fashion by a prescribed unit angle according to the polarity of the distribution signal $S_2$ whenever the distribution signal $S_2$ is generated. The step motor is then rotated to make the "control point" $P_M$ approach the "command point" $P_c$ which is moved in unison with the torque/angle curve. FIG. 5 shows an example of the relationship of the "command point" $P_c$, the "control point" $P_M$ and the torque/angle curves before and after the above-mentioned stepwise movement. A detailed description of the manner in which the torque/angle curves are generated has been omitted herein for purposes of simplicity. A more detailed description of the manner in which such polyphase signals are generated is set forth in copending U.S. application Ser. No. 750,049, filed Aug. 5, 1968 and assigned to the assignee of the present invention. The detailed description set forth therein is incorporated herein by reference thereto. For purposes of understanding the present invention it should be understood that the distributor may be a well-known digital interpolator comprising a digital differential analyzer which is conventionally employed in numerical control devices. A polyphase detector which generates polyphase detection signals having prescribed stepwise phase differences has one of its polyphase signals selected as the signal which drives the step motor of the driving unit. The selected phase detection signal may be applied to a phase discriminator circuit which may be comprised of a phase discriminator and power amplifier for discriminating the phases of selected positioning phase signal and for amplifying the signal before application to the driving means.

Figure 6:
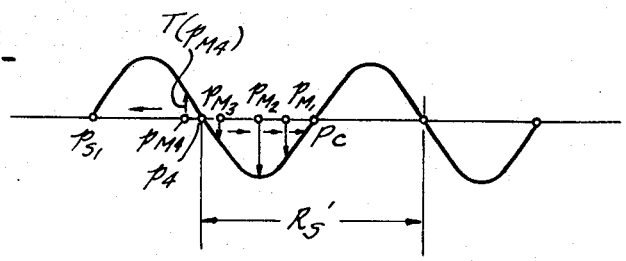

Misfollowup may occur in the following manner:

In FIG. 2, a distribution signal $S_2$ is abruptly applied to driving unit 3 to accelerate the controlled member 4 causing the "command point" $P_c$ to be correspondingly moved in a rapid fashion. There is a limit, however, to the output torque of the step motor and, if a large torque is required for accelerating the controlled member 4, the "controlled point" $P_M$ is not able as a practical matter to follow the "command point" $P_c$ causing a relative positional difference (i.e. droop) to grow increasingly larger. This can be understood from a consideration of FIG. 6 wherein the "command point" $P_c$ is taken as a starting point or point of origin. In other words, the "control point" $P_M$ gradually moves away from the "command point" $P_c$ toward points $P_{M1}$, $P_{M2}$ and $P_{M3}$. Thus, if the control point moves beyond an "unstable point" $P_4$ which is the boundary of the "stable region" $R'_s$, the output torque of the step motor is generated in a direction $T(P_{M4})$ as shown in FIG. 6 which direction is actually opposite to the followup direction. The "control point" $P_M$ is thus moved rapidly toward a "stable point" $P_{s1}$ which is spaced from the "command point" $P_c$ by one period. This phenomenon is referred to as misfollowup. It may occur in an extreme case that the "control point" $P_M$ lags behind the "command point" by as much as several such periods. Although misfollowup has been described for the case of acceleration of the controlled member the phenomenon of reverse misfollowup (viz overadvance) may also occur in the case of abrupt deceleration.

The phenomenon of misfollowup is frequently observed in digital driving equipment employing an electric step motor whose "stable region" $R'_s$ is quite small. Digital driving equipment of the open-loop system type and which employs a step motor, has no means to detect the movement of the step motor or controlled member, thereby making it impossible to detect the occurrence of misfollowup and the number of periods of such misfollowup. Hence, it is also impossible to correct for such misfollowup. This is a fatal defect of such step motor type digital driving equipment (for example, a numerical control device provided with a step motor) and is basically the reason why step motors are considered to be impractical for such applications.

In the case of conventional digital driving equipment provided with a step motor (i.e. the system as shown in FIG. 2), in order to maintain inertial and frictional torque of the controlled member 4 to be relatively small, a step motor with a sufficient margin of output torque is normally used for driving a load which consists mainly of the controlled member. In order to avoid abrupt acceleration or deceleration of the step motor, the acceleration or deceleration of the movement of "command point" $P_c$ is conducted with a negative amount of increasing or decreasing occurrence per time rate of the distribution command signal $S_1$ in a one-sided fashion in accordance with an exponential function of a prescribed time constant, irrespective of the movement of the controlled member. The time constant employed is scarcely equal to that of a mechanically movable portion comprising the step motor and the controlled member 4. If the former time constant is smaller than the latter one, the system is defective in that an abrupt mechanical distortion develops in the controlled member driven by the step motor that has a sufficient margin of output torque.

In the case where electric oil pressure pulse motors are employed wherein an oil pressure valve is operated to amplify the torque of the electric step motor, the "stable region" of the oil pressure unit is taken to be extraordinarily wide. However, the "stable region" $R'_s$ of the electrical step motor is still quite narrow. Therefore, in addition to the possibility of misfollowup of the electric step motor, the droop may become quite large if the electric step motor is abruptly accelerated, and ultimately the oil pressure motor will not be able to follow the electric step motor causing the oil pressure motor to generate still another step or period of misfollowup. In the case of numerical contouring-control, the droop itself becomes a positional deviation. Therefore, there exists a major defect in that the most important feature of numerical control, viz high accuracy controllability is incapable of being achieved.

Even if a step motor type digital phase modulation system is employed in place of driving an oil pressure valve by means of the step motor, it is still found to be impossible to avoid the above-mentioned defect encountered in the use of an electric oil pressure pulse motor. The step motor type digital phase modulation system operates as follows:

The rotor of a command-use synchro-generator 21 (see FIG. 16) is rotated by means of electric step motor 22. A feedback-use synchro-generator 25 has its rotor rotating in conformity with the movement of the controlled member 26. Signals (for example, 400 Hz. AC are supplied from source 27 to the stators of the command-use synchro-generator 23 and the feedback-use synchro-generator 25 thereby causing rotating magnetic fields to be generated. A discriminator 28 produces a positive or negative output signal in conformity with the phase difference which is detected from the command phase signals obtained from the rotor of the command-use synchro-generator and the feedback phase signal obtained from the rotor of the feedback-use synchro-generator. The input power for driving the controlled member is controlled by means of, for example, an oil pressure servovalve (not shown) or thyristor (also not shown) using the output of the discriminator. The driving motor (which may, for example, be an oil pressure motor coupled with an oil pressure servovalve or an electric motor coupled with a thyristor) drives the controlled member in accordance with the output of discriminator 26 to reduce the output of the discriminator to zero.

As another alternative arrangement, a conventional purely electronic digital phase modulation system for generating a command phase signal obtained by means of an electrical step motor and a command-use synchro-generator may be substituted for the arrangement of FIG. 16. However, it has been found that misfollowup will nevertheless occur in such an arrangement unless the motor rotated by the above-described feedback phase signal is kept within the prescribed phase difference (for example, ± 90°) as compared with the command phase signal.

THe above disadvantages may be overcome through the employment of a digital driving system having a step motor which is comprised of means for performing a digital-analogue conversion.

As shown in FIG. 3 of the present application, a first means 6 is provided for generating a distribution control signal $S_c$. The distribution control signal $S_c$ is logical 0 when the "control point" $P_M$ occupies a prescribed relationship with regard to the "command point" $P_c$. As was previously described, this prescribed relationship is such that the distribution control signal $S_c$ will be logical 0 whenever the "control point" $P_M$ lies within the "stable region" $R_s$. Conversely, the distribution control signal $S_c$ will be logical 1 when the "control point" $P_M$ lies outside of the "stable region" $R_s$. The term "stable region" $R_s$ will hereinafter refer to the practical "stable region" as was previously explained with regard to FIG. 4.

FIG. 7a shows a plurality of waveforms illustrating the relationship between and among the distribution control signal $S_c$, "stable region" $R_s$, "command point" $P_c$, "control point" $P_M$, torque/angle curve C, and a torque $T(P_M)$ which is generated by a step motor. FIG. 7a shows the operating condition wherein the "control point" $P_M$ is located outside of the "stable region" $R_s$ and the resulting distribution control signal $S_c$ is thus logical 1 at this time. FIG. 7b illustrates the condition in which the "control point" $P_M$ is located outside of the "stable region" $R_s$ and the distribution control signal $S_c$ is thus logical 1 at this time. The command point $P_c$ in FIGS. 7a and 7b is shown as being located in the middle of the "stable region" $R_s$. From a consideration of these FIGS. it can be seen that when the positional difference between the control point $P_M$ and the command point $P_c$ is smaller than one-half of the width of stable region $R_s$, the distribution control signal $S_c$ is equal to 0; while in the case where the position difference is larger than one-half of the width of stable region $R_s$ the distribution control signal is equal to 1. Thus, the same distribution control signal $S_c$ is generated as described above even if the control point $P_M$ settles in the middle of stable region $R_s$ instead of at the command point $P_c$.

FIGS. 8a — 8c illustrate one preferred embodiment of the first means 6 of FIG. 3 for generating a distribution control signal $S_c$ in accordance with whether the "command point" $P_c$ lies inside or outside of a region $n_s$. As shown in FIG. 1, since the torque/angle curve is periodic with reference to the rotating angular position of a step motor, it is assumed here that the number of steps within one period is equal to $N_1$, the number of steps within the "stable region" $R_s$ is equal to $N_s$ ($N_1$, $N_2$,....,$N_s$), and the number of periods in one revolution (360°) of the step motor is $M$.

The apparatus of FIGS. 8b and 8c is comprised of a disc shaped member 7 (only a portion of which has been shown in FIGS. 8b and 8c for purposes of simplicity) which is mechanically coupled with the rotary axis (i.e. output shaft) of a step motor. The disc shaped member is divided in such a manner as to have $M$ pie-shaped sections each of equal size or angle around its circumference. A rotation angle $n$ of each such pie-shaped section corresponds to N steps. A portion of each pie-shaped section of N steps is provided with a slit 7a with the angular extent of each slit corresponding to a rotational angle $n_u$. The angle of each such slit is made equivalent to the angle of a "stable region". The portion of the slit plate 7, shown in FIGS. 8b and 8c corresponds to the circumferential portion of the slit plate. As shown in FIGS. 8b and 8c, light is emitted from a light source $L_A$. The light is condensed by means of lens L which occupies a region at least as great as a rotational angle of $n$ steps. N light beams are led to detectors $d$ through light tubes $l_1 — l_N$. Each of the light tubes may be comprised of a glass fiber for guiding light along the light tube with extraordinarily low attenuation and with very little leak of light interference between and among the light tubes. The light tubes are located in positions which are respectively fixed in correlation with the step motor. A plurality of detectors $d_1 — d_N$ are arranged so as to face an associated one of the light tubes $l_1 — l_N$ so as to occupy correlatively fixed positions. The slit-plate 7 is interposed between the detectors $d_1 — d_N$ and the light tubes $l_1 — l_N$. When a light tube and its associated detector is aligned within a slit of slit-plate 7, such as, for example, light tube $l_K$ and detector $d_K$, the light guided by the light tube $l_K$ is detected by detector $d_K$ causing a signal $D_K$ to be applied to an associated amplifier $A_K$. It can clearly be seen that each of the amplifiers of amplifier group $A1 — A_N$ is associated with and connected to one of the detectors $d1 — d_N$. Returning to the example, the output signal $AD_K$ of amplifier $A_K$ is now at logical 1. Considering another example, i.e. the light tube $l_N$ and detector $d_N$, no light will be passed to detector $dN$ due to the interposing of an opaque portion (i.e. a nonslitted portion) of disc 7 so that the output of its associated amplifier $A_N$ will be at logical 0.

Each of the amplifiers $A_1 — A_N$ have their outputs applied to one input of associated gates $G1 — G_N$. The remaining input terminals of each of the gates $G_1 — — G_N$ are connected to associated outputs of a ring counter (not shown) generating signals $E1 — E_N$. The ring counter comprises one element of the driving unit 3, shown in FIG. 3. The torque/angle curve advances in stepwise fashion in response to the signals $E1 — E_N$ and likewise the "command point" $P_c$ advances in synchronism therewith. Only one of the signals $E1 — E_N$ will be at logical 1 at any given moment while the remaining signals of the ring counter will be at logical 0. When signal $E_1$ is at logical 1, one "command point,— viz the first "command point" is selected. When signal $E_2$ is at logical 1, a "command point" occupying the next step position will be selected. In a similar fashion, when signal $E_N$ is at logical 1, the Nth command point is chosen.

Since there is a total of N command points, the Nth "command point" occurs one step prior to the "command point" corresponding to the signal $E_1$ as the ring counter continues its periodic operation.

When one of the signals $E1 — E_N$ opens its associated gate $G1 — G_N$ at a time at which the slotted portion of slit-plate 7 occupies a corresponding position, a distribution control signal $S_c$ of logical 0 will be produced from NOR circuit (i.e., inverter) 8. As can clearly be seen from FIG. 8b all of the outputs of gates $G1 — G_N$ are ORed and applied as a single input to inventor or NOR circuit 8. Thus, the output $S_c$ of NOR circuit 8 will be binary 0 when any one of the gates $G1 — G_N$ is at the binary 1 level. Conversely, the output $S_c$ will be binary 0 when all of the outputs of gates $G1 — G_N$ are binary 0. The logical 0 state of signal $S_c$ corresponds to the 0 state as shown in FIG. 7a and in FIG. 8a.

When one of the signals $E1 — E_N$ enables one of the AND gates $G_1 — G_N$ which gate occupies the position in alignment with a nonslitted portion of disc 7, a distribution control signal $S_c$ of logical 1 will be generated. This corresponds to the 1 state as shown in FIGS. 7b and 8a.

The arrangement of the embodiment of FIGS. 8b and 8c can be seen to be somewhat similar in mechanical construction to incremental shaft angle encoders which are normally employed in step motor type driving equipment (especially for improving positional accuracy) for the purpose of generating detection pulses to count each time a controlled member moves by a unit control quantity (for example, 0.002mm.). It should be carefully noted, however, that the device of FIGS. 8b and 8c is quite different from such encoding equipment since such incremental shaft angle encoders are provided with slits each having a pitch suitable for a single detection pulse and since such encoders employ only a few combinations of light sources and detectors. Also, such encoders normally employ the multiple light sources aligned in radial fashion whereas the light source and detectors of the present invention are arranged substantially in circumferential fashion. In addition thereto, the device of FIG. 8b employs N pairs of light tubes and detectors suitable to cover one period of the torque/angle curve of a step motor. The slotted disc of the present invention has slits whose rotational angle each corresponds to the width of a "stable region" $R_s$ whose pitch is $N$ and whose number of periods in a torque/angle curve is $M$. Further, in addition thereto, the device of the present invention differs from conventional incremental shaft angle encoders in that it employs the AND gates $G_1 — G_N$ selectively enabled by signals $E_1 — E_N$ derived from a ring counter and further employs a NOR circuit 8 for deriving the logical sum of the outputs of AND gates $G_1 — G_N$.

FIG. 9 shows still another alternative embodiment of the first means 6 and is comprised of a slotted disc shaped member 7 and a NOR circuit 8 which are respectively the same as those indicated with like numerals in FIG. 8b. An amplifier $A'$ which has the same performance characteristics as the amplifiers $A1 — A_N$ of FIG. 8b is coupled between a detector $d'$ and the input of NOR circuit 8. The operation of the embodiment of FIG. 9 is as follows:

N separate light sources $l_1 — l_N$ are each arranged in the manner shown in FIG. 9 in place of the light tubes $l_1 — l_N$ as shown in FIGS. 8b and 8c. The light sources are provided in close proximity to one surface of the slotted disc member and are capable of performing high speed On-Off operations. One of the light sources is lighted by a logical 1 signal taken from the group of signals $E_1-E_N$. In the case where the energized light source is aligned with one of the slits (for example, where signal $E_K$ is logical 1) the light will impinge upon detector $d'$ (which is capable of detecting the presence of light from any one of the light sources $l_1'-l'_N$) *and the signal so detected is applied to the input of amplifier A'. The distribution control signal $S_c$ will thus become logical 0 as a result of the operation of NOR circuit 8. This corresponds to the case shown in FIG. 7a* (and 8a). If the energized light source is not in alignment with one of the slits (for example, in the case where signal $E_1$ is logical 1), no light will pass to detector $d'$ and the distribution control signal $S_c$ will be logical 1 at this time. The operation corresponds to that shown in FIG. 7b (and FIG. 8a).

FIG. 10 shows still another embodiment of the first means 6. The apparatus shown in FIG. 10 employs the digital phase modulation type "stable point" detection method described hereinabove. A synchro-detector 9 is mechanically coupled to the output rotary axis of a step motor contained within driving unit 3 which drives the controlled member (not shown). Detector 9 is excited by a signal $S_E$ derived from a rectangular wave signal $S_p$ having a predetermined reference frequency and generated by an oscillator 10. Signal $S_p$ is applied to filter circuit 11. The detected signal V developed by synchro-detector 9 is applied to the input of unit 12 which is a phase-inverter and phase-shifter circuit employed for developing the signals $V_D$ and $-V_D$.

A synchro-controller 13 receives the above-mentioned rectangular wave signal $S_p$ as well as the distribution signal $S_2$ derived from the distributor 2 shown in FIG. 3. The synchro-controller 13 develops a modified command signal $S'_p$ which is applied to the input of unit 14 which consists of both an N × M rotation counter and a filter circuit (not shown in detail). The modified command signal $S'_p$ is developed by adding or subtracting the distribution signal $S_2$ and the rectangular wave signal $S_p$ which either precedes or lags by a prescribed phase in conformity with the polarity of the distribution signal $S_2$. The unit 14 produces a command phase signal VC. The phase-shifter included in unit 12 is adjusted (see FIG. 11b) to shift the phase of the signal $V_d$ so as to shift the phase of the signals $V_D$ and $-V_D$ by 90° relative to the command phase signal $V_c$ when the position of the "control point" $P_M$ is coincident with that of the "command point" $P_c$.

The operation of FIG. 10 occurs as follows:

When a droop is present, the command phase signal $P_c$ is shifted (for instance, in the direction as shown by the arrow A of FIG. 11b) FROM THE STATE OF 90° phase difference relative to the signal $V_D$. At this time, the unbalanced value $||E_1|-|E_2||$ is produced by discriminator 15 as already described, in response to the amplitudes (i.e., absolute values) of signals $E_1$ and $E_2$. In the case of FIG. 11a, it can be seen that the amplitudes are balanced as well as being equal, and that the difference of their absolute values is zero. FIG. 11b shows the case where the signals are not only unbalanced, but their amplitudes are unequal and hence the difference of their amplitudes is greater than zero. The distribution control signal $S_c$, which should be logical 1 when the unbalanced value $||E_1|\sim|E_2||$ is present, may be generated in a straightforward manner simply by the employment of a Schmitt circuit 16 for generating the logical 1 state when the "command point" $P_c$ goes beyond the "stable region" $R_s$.

The functional units designated by the numerals 9 through 15 shown in FIG. 10 are conventionally employed for generating a difference signal $|E_1|\sim|E_2|$ in digital driving equipment which performs a digital phase modulation type digital-analogue conversion. Thus, such units have been advanced to the state where their designs are such as to be capable of preventing the development of drift in the signals $V_D$ and $V_c$ as a result of variations in environmental conditions, such as power source voltage, temperature, humidity, and so forth. However, the circuitry of FIG. 10 is primarily concerned with detecting the presence or absence of the "stable region" $R_s$ of the step motor torque/angle curve which is achieved through the use of a Schmitt circuit 16 to generate the distribution control signal $S_c$, which objective is essentially different from that of phase modulation type digital servosystems.

FIG. 12 shows one preferred embodiment which may be employed as the second means 5 of FIG. 3 which is employed to control the distribution command signal $S_1$ by means of signals which include the distribution control signal $S_c$ derived from the first means 6 of FIG. 3. The second circuit means 5, in turn, supplies a controlled distribution command signal $S'_1$ to distributor 2.

The embodiment of FIG. 12 is designed to generate a signal represented by logical equation (1) as follows:

$$S'_1 = S_1 \cdot \overline{S}_c, \quad (1)$$

in which "." indicates a logical AND operation.

The distribution control signal $S_c$ is converted into $\overline{S}_c$ by means of NOR circuit 17 for the purpose of selectively opening or closing the AND gate 18. Thus, when the distribution control signal $S_c$ is logical 0, the AND gate 18 is enabled (i.e., opened), resulting in $S'_1 = S_1$. In a like manner, when signal $S_c$ is logical 1, the AND gate 18 is disabled (i.e., closed), resulting in $S'_1 = 0$ (i.e., the controlled distribution command signal $S'_1$ is not generated).

The operation of the present invention as shown in FIG. 3, when employing one of the first means of FIGS. 8 through 10 and the second means of FIG. 12 will now be described with reference to the plot of waveform shown in FIG. 13.

I. ACCELERATION OF THE CONTROLLED MEMBER

Since forward and reverse rotation is substantially similar, only forward rotation (i.e., rotation represented by the direction of arrow 25) will be described herein for purposes of simplicity.

The "control point" $P_M$ moves away from the "command point" $P_c$ in stepwise fashion and approaches a point $P_{10}$. If the distribution signal $S_2$ is supplied to the driving unit 3 at this time, the "command point" $P_c$ is moved forward by one step. The "control point" $P_M$ then moves beyond the point $P_{10}$ and thereby moves out of the "stable region" $R_s$ (for instance, to a point $P_{M1}$). Since the distribution control signal $S_c$ which is in logical 1 state is generated by the first means and applied to the second means, the signal $S'_1 = 0$ is generated (for the the reasons and description set forth hereinabove) and the distributor 2 terminates the generation of the distribution signal s2. The "command point," therefore, does not move forward, and the droop is not increased. In addition, the "control point" $P_M$ moves toward the "command point" $P_c$ by means of the restoring torque $$T(P_M) = T(P_{M1}) \cong T(P_{10})$$

at the "control point" $P_M$ and moves back into the "stable region" $R_s$ by moving across the point $P_{10}$ toward the point $P_{M2}$, for example. At this time, the distribution control signal $S_c$ becomes logical 0, so that the output signal of the circuit of FIG. 12 becomes $S'_1 = S_1$, and the controlled distribution command signal $S'_1$ is thereby supplied to distributor 2. As a result, the distribution signal $S_2$ is applied to driving unit 3 from distributor 2, and the "command point" $P_c$ again moves away from the "control point" $P_M$. Thus, during the acceleration operation, the "control point" $P_M$ remains substantially in the vicinity of the point $P_{10}$ which is located to one side of the "stable region" $R_s$ and the droop is never increased by more than that amount. After the acceleration, when the feed rate of the controlled member 4 returns to normal, the "control point" $P_M$ follows the "command point" $P_c$ by remaining slightly behind but in the vicinity of the "command point."

It can be seen that operation in the above manner completely eliminates misfollowup, which is the primary advantage of the present invention. In addition, the torque $T(P_M)$ is nearly equal to $T(P_{10})$ during the acceleration operation. The controlled member 4 is smoothly accelerated (with nearly uniform accelerating speed) until the energy supplied by the step motor is balanced with the energy consumed in the controlled member 4. The smooth acceleration is the second major advantage of the present invention. In addition, even in the case where maximum droop is experienced, the "control point" $P_M$ moves outside the "stable region" $R_s$ by one step at most, so that the droop is held within the prescribed value, yielding the third major advantage of the invention.

II. DECELERATION OF THE CONTROLLED MEMBER

1. When the kinetic energy of the controlled member 4 is small, the digital driving equipment operates as follows:

When a distribution signal $S_2$ is generated, the distribution signal $S_2$ is subtracted by 1 from the number which has been presented to the distributor. When its balance becomes smaller than the prescribed value, the decelerating command signal $S_D$ is generated. This signal is fed to the distribution command unit 1 from distributor 2, causing the occurrence time rate of the distribution command signal $S_1$ to be reduced by a prescribed amount. In a normal state after the acceleration, the "control point" $P_M$ which is following the "command point" $P_c$ at a high speed prior to deceleration, gradually begins to approach the "command point" $P_c$ whose moving speed has been reduced and the thereby passes it in a short time, moving, for example, to the point $P_{M3}$. This state represents that a reverse droop is being generated (i.e., a state of overadvance). When the kinetic energy of the controlled member 4 is small, both the restoring torque (which now becomes the damping torque) of the step motor and the friction torque of the moving portion of controlled member 4 consume the kinetic energy rapidly. Thus, the moving speed of the controlled member 4 is swiftly decelerated, and, as a result, the "control point" $P_M$ will continue to follow the "-command point" $P_c$ in a closely lagging position.

In the case when a controlled member 4 has an extraordinarily large kinetic energy compared with that supplied by the step motor, the "control point" $P_M$ which is following the "command point" $P_c$ with a high moving speed before deceleration, not only moves ahead of the "command point" $P_c$ (whose moving speed has been lowered by the decelerating command signal $S_d$) but also passes the boundary $P_{11}$ of the "stable region" $R_s$. In the case where the second means shown in FIG. 12 is employed, its output signal becomes $S_1' 0$, so that the "command point" $P_c$ is faulted. Consequently, the "control point" $P_M$ tends to move away relative to the "command point" $P_c$ and finally passes the "unstable point" and generates reverse misfollowup, as was explained previously.

FIG. 14 shows a circuit arrangement which may be employed as an alternative embodiment for the second means 5 of FIG. 3, which alternative embodiment provides means for eliminating the reverse misfollowup which can occur in the embodiment of FIG. 12, as was described above. The alternative embodiment of FIG. 14 is capable of generating a signal which is represented by logical equation (2):

$$S_1 = S_1 \cdot \bar{S}_c + S_1'' \bar{S}_c \cdot (S+ \cdot \bar{S}_T + S- \cdot \bar{S}_T), \quad (2)$$

here, "." signifies a logical AND: "+", a logical OR.

The signal $S_T$ which is applied to the circuit of FIG. 14 is a distribution control signal which becomes logical 0 or 1 in conformity with the torque/angle curve and is generated by means similar to that employed to generate the distribution control signal $S_c$. It is not necessarily required that this signal be one whose logical state can be understood depending upon the "command point" $P_c$ which is taken as a borderline position. In brief, this signal is to be logical 1 or 0 within a prescribed width whose center coincides with each border of the "stable region" $R_s$ as shown in FIG. 15.

The signals S+ and S− applied to the circuitry of FIG. 14 respectively represent the polarized signals which indicate the distribution direction of a distribution signal $S_2$. The signal $S_1'$ is a pulse signal having an occurrence per time rate higher than the moving speed of the controlled member 4. This signal $S_1$ is fed to AND gates 21 and 22 simultaneously, and may, for example, be an oscillator whose output is coupled to a respective input of each of the gates 21 and 22.

The manner in which misfollowup can be eliminated through the employment of the circuit of FIG. 14 will now be described with reference to waveforms of FIG. 13.

In the case of forward rotation, only the term S+ occurs or is in logical 1 state in equation (2). Assuming that the "control point" $P_M$ moves out of the "stable region" $R_s$ (for example, the position of point $P_{M4}$) then the first term of equation (2) is not operative, and only that portion of the second term including the signal S+ is operative since the terms $S_c$, S+ and $S_T$ are all in logical 1 state at this time. In other words, the distribution control signal $S_c$ closes gate 18 of FIG. 14 and satisfies one of the conditions for opening a gate 21 and for opening a gate 22. The second distribution control signal $S_T$ closes gate 22 due to the operation of NOR circuit 19 while simultaneously satisfying one of the conditions for opening gate 21. Since forward rotation is being considered in the present example, the polarized signal S− closes gate 22, then the polarized signal S+ satisfies the final condition for opening gate 21. Gate 21 is thus enabled, allowing a high speed pulse $S_1'$ to be applied from gate 21, resulting in the rapid movement of "command point" $P_c$ so that the "control point" $P_M$ approaches the "command point" $P_c$ relatively closely and moves back into the "stable region" $R_s$ again (for instance, moving to the point $P_{M5}$). The first term of equation (2) becomes operative at this time, and the second term terminates its operation. In this manner, the "control point" $P_M$, even though it moved out of the "stable region" $R_s$, is restored immediately to the "stable region" $R_s$. In the meantime, the kinetic energy of controlled member 4 is smoothly reduced by the torque (which operates as a damping torque in this case and its magnitude is equal to $T(P_{11})$ even at the time of deceleration) of the step motor and the friction torque of the controlled member 4. When the feed rate of the controlled member 4 returns to normal, the "control point" $P_M$ will follow slightly behind the "command point" $P_c$. Thus, even at the time of deceleration, the advantages of the present invention are still apparent. Thus, removal of this misfollowup, smooth deceleration of the controlled member and maintaining the droop within the prescribed value are all achieved through the use of the alternative embodiment of FIG. 14 in conjunction with the system of FIG. 3. It should be obvious from the above description that the same results are achieved in the case of rotation in the reverse direction. At the time of deceleration in the case of reversal, since a signal $\bar{S}_T$ is supplied by means of NOR circuit 19 of FIG. 14, the item of the second term including the polarized signal S− and then the first term as well become operative equation (2).

While preferred embodiment of the invention have been shown and described herein, it should be understood that the forms of the present invention are not intended to be limited to the circuit embodiments illustrated hereinabove with regard to the drawings. Considering still another embodiment of the second means shown in FIG. 12, for example, in the case where the distribution command unit 1 is comprised of well-known means for generating a distribution command signal $S_1$ whose occurrence/time rate undergoes a change in conformity with voltage signals applied from an exterior source, it is possible to provide a flip-flop and an integration circuit consisting of capacitors and resistors in place of the gates 18, 21 and 22 such as is shown in FIGS. 12 and 14, for the purpose of changing the occurrence/time rate of distribution command signal $S_1$. The flip-flop circuit may then be triggered by the distribution control signals including signal $S_c$. The integration circuit which preferably has a prescribed time constant receives the output signal from the flip-flop and applies its output voltage to the distribution command unit 1.

As still a further modification, it should be obvious that, although the present invention has been described for purposes of simplicity, as having one driving unit (unit 3 of FIG. 3), various modifications can be derived by combining devices based upon the present invention. For example, in the case where the driving unit 3 of FIG 3 is to be adapted for a 3-axis (x, y, z) driving set, then three driving units $3_x$, $3_y$ and $3_z$ are provided in the same manner as is employed in complicated numerical control equipment. The first means of the present invention should be provided for each of the driving units for generating control signals $S_{cx}$, $S_{cy}$ and $S_{cz}$, and a signal which represents the logical sum $S_{cx} + S_{cy} + S_{cz}$ of the distribution control signals is then applied to the second means 5 in place of the distribution control signal $S_c$, shown in FIG. 3.

The degree of care which should be exercised in operating the equipment of the present invention need only be as follows:

When power is supplied to the equipment of the present invention, as shown in FIG. 3, it is not clear at what point among the several "stable points" the rotor of the step motor will settle on. In order to derive the advantages of the present invention, it is required that one of the "stable points" be selected as the "command point" $P_c$ and that the "control point" $P_M$ coincide with the position of the "command point" $P_c$. This operation of coinciding the points can be made very simply as follows:

When the "control point" $P_M$ is not within the "stable region" $R_s$, the distribution control signal $S_c$ is at logical 1. Conversely, when within the "stable region," $S_c$ is at logical 0. Therefore, when the amplified distribution control signal $S_c$ is at logical 1, a lamp may be lighted to inform an operator that the "control point" $P_M$ is outside the "stable region" $R_s$. Then the operator, by supplying a second output distribution signal $S_c'$ (not shown in FIG. 3) to drive unit 3 from a separate distribution signal generating unit (not shown) will be able to operate drive unit 3 independently of and regardless of the operation of the remaining units (1, 2, 5, 6, c.), which operation may continue until the lamp condition is extinguished so as to make the "control point" $P_M$ coincide with the selected "command point" $P_c$ within $1/M$ revolution at the most. It should further be understood that the above-described operation may be fully automated to totally relieve the operator of this function, if desired.

Although this invention has been described with reference to its preferred embodiments, it should be understood that many variations and modifications will now be obvious to those skilled in the art, and it is preferred, therefore, that the scope of the invention be limited not by the specific disclosure herein, but only by the appended claims.

We claim:

1. Digital driving equipment for accurately positioning a controlled member comprising:
    a distribution command unit having input means for receiving first information to generate distribution command signals spaced by time intervals inversely proportional to command feed rate by using said first information which prescribes the command feed rate at which a controlled member is to be moved;
    first means coupled to said distribution command unit for generating a controlled distribution command signal;
    distributor means coupled to said second means and means for receiving second information to generate a distribution signal using both said controlled distribution command signal and said second information which prescribes the method of distribution;
    a driving unit including a motor for moving said controlled member toward a command point called for by said distributor; which command point is one of a group of stable points arranged at spaced intervals, said distributor being adapted to move said motor in stepwise fashion from one stable point to the next when each distribution signal is applied to said driving unit;
    said driving unit being adapted to drive the controlled member by the torque generated in said motor by each said distribution signal;
    second means coupled to said motor and said distributor means generating a distribution control signal when a control point of said motor is in a prescribed positional relation with said command point; and
    said first means including means coupled to said second means for altering the signal applied to said distributor means when said distribution control signal is generated.

2. The digital driving unit of claim 1 wherein said second means is further comprised of third means for receiving said distribution signals;
    fourth means mechanically coupled to said controlled member for determining the control point of said motor; and
    means for comparing the outputs of said third and fourth means for generating a first signal when the control point information and its associated distribution signal lie within a predetermined range and for generating a second signal when the control point information and its associated distribution signal lie outside of said predetermined range.

3. The digital driving unit of claim 2 wherein said first means is further comprised of gating means coupled to receive said distribution command signals and said comparing means signals for passing said distribution command signals when said comparing means first signal is received and for inhibiting said distribution command signals when said comparing means second signal is received.

4. The digital driving means of claim 1 wherein said second means is further comprised of:
    a disc having a plurality of radially aligned slits arranged at spaced intervals around said disc;
    said disc being driven by the output shaft of said motor;
    said slits each having a width substantially equal to the stable operating range for each control point;
    a light source for projecting light upon a predetermined sector of said disc, said sector being narrower than the distance between the center lines of adjacent discs;
    a plurality of light conducting members arranged to lie substantially along an imaginary straight line and being positioned between said light source and one side of said disc so that said imaginary line lies perpendicular to said radial direction;
    a plurality of light detectors arranged to lie substantially along a second imaginary straight line on the opposite side of said disc; said imaginary lines being arranged spaced parallel fashion;
    said disc being driven by the output shaft of said motor;
    said slits each having a width substantially equal to the stable operating range for each control point;
    a plurality of normally deenergized light emitting sources each having a control input arranged to lie substantially along an imaginary straight line which is aligned perpendicular to the radial direction of said disc on one side of said disc for selectively directing light rays toward said disc;
    at least one detector means arranged to lie along a second imaginary straight line and being positioned on the opposite side of said disc for selective energization by said light emitting sources when one of said slits is aligned with an energized light emitting source;
    an inverter coupled to said detector means; and
    said distributor means further comprising means for distributing said pulses to the inputs of said light emitting sources in sequential fashion thereby sequentially enabling said light emitting sources to selectively pass signals generated by said detector when alignment occurs between an energized light source and one of said slits.

6. The digital driving means of claim 1 wherein said second means further comprises:
    a synchro-detector having a rotor and a stator, said rotor being driven by said motor;
    means for applying first pulses to said synchro-detector stator at a rate faster than the rate of application of said driving signals;
    means coupled to said synchro-detector for converting the output of said synchro-detector into a pair of signals of equal amplitude and opposite polarity;

gating means for receiving said first pulses and said driving signals to generate a first output when a driving signal and a first pulse are simultaneously applied thereto;

first means for generating a third signal representing the vector sum of said first output and one of said pair of signals;

second means for generating a fourth signal representing the vector sum of said first output and the other one of said pair of signals; and third means for comparing the absolute values of said vector means to generate a fifth signal having a first level when the absolute value of said third signal is greater than the absolute value of said fourth signal and having a second level when the absolute value of said third signal is less than the absolute value of said fourth signal.

7. The device of claim 1 wherein said first means is further comprised of:

an inverter for inverting the state of said second means output; and gating means for receiving distribution command signals from said distribution command means and for receiving the output of said inverter to pass said distribution command signals when the output of said inverter is at a predetermined level.

8. The device of claim 7 wherein said distributor means includes means for generating signals for controlling the direction of rotation of said motor; said first means being further comprised to second gating means responsive to said second means and said direction controlling signals generated by said distributor means for generating output signals applied to the input of said distributor means for preventing overshoot of said motor means when said motor is being decelerated by said distributor means.